United States Patent [19]

Johnson et al.

[11] 4,255,927

[45] Mar. 17, 1981

[54] COMBUSTION CONTROL SYSTEM

[75] Inventors: Robert H. Johnson, Bolton Landing; Colin Wilkes, Scotia, both of N.Y.

[73] Assignee: General Electric Company, Schenectady, N.Y.

[21] Appl. No.: 920,191

[22] Filed: Jun. 29, 1978

[51] Int. Cl.[2] .......... F02C 9/14

[52] U.S. Cl. .......... 60/39.23; 60/39.29; 60/39.37

[58] Field of Search .......... 60/39.23, 39.37, 39.51 R, 60/39.29

[56] References Cited

U.S. PATENT DOCUMENTS

| | | | |
|---|---|---|---|
| 2,625,011 | 1/1953 | Allen et al. | 60/39.37 X |
| 2,858,671 | 11/1958 | Fox . | |
| 3,527,052 | 9/1970 | Bryce . | |
| 3,577,878 | 5/1971 | Greenwood et al. . | |
| 3,584,459 | 6/1971 | Amann . | |
| 3,618,319 | 11/1971 | Kydd . | |
| 3,691,761 | 9/1972 | Jackson et al. . | |
| 3,731,484 | 5/1973 | Jackson et al. . | |
| 3,742,703 | 7/1973 | Melconian . | |
| 3,744,242 | 7/1973 | Stettler et al. . | |
| 3,826,078 | 7/1974 | Quigg . | |
| 3,869,246 | 3/1975 | Hammond, Jr. et al. . | |
| 3,899,881 | 8/1975 | Arvin . | |
| 3,902,316 | 9/1975 | Huellmantel | 60/39.29 X |
| 3,911,285 | 10/1975 | Yannone et al. | 60/39.28 R |
| 3,952,501 | 4/1976 | Saintsbury . | |
| 3,975,900 | 8/1976 | Pfefferle | 60/39.23 X |
| 3,978,658 | 9/1976 | Forbes et al. | 60/39.37 X |
| 3,986,347 | 10/1976 | Schirmer | 60/39.51 R |
| 4,050,238 | 9/1977 | Holzapfel | 60/39.23 |
| 4,085,579 | 4/1978 | Holzapfel et al. | 60/39.23 X |

*Primary Examiner*—Carlton R. Croyle
*Assistant Examiner*—Edward Look
*Attorney, Agent, or Firm*—Jerome C. Squillaro

[57] ABSTRACT

A combustion system for gas turbines is disclosed which is capable of burning gaseous and liquid fuels. Excess air injected into the reaction zone of the combustor produces either a fuel-lean or fuel-rich mixture which lowers the temperature at which combustion occurs and thereby reduces the amount of nitrogen oxides in the turbine exhaust. Efficient combustion is maintained across a wide range of turbine loads by means of a control mechanism disposed externally of the combustor, which directs the airflow from the compressor to the reaction zone and to the downstream dilution zone respectively in a manner which permits variable, inverse proportioning of the air supplied to these zones. The variation in the pressure drop across the combustor is maintained within acceptable limits throughout the full load range.

19 Claims, 3 Drawing Figures

COMBUSTION CONTROL SYSTEM

The present invention relates in general to a new and improved combustion control system, in particular to a control system for gas turbines which is capable of burning both residual and distillate fuels while minimizing the emission of nitrogen oxides, smoke and other undesirable exhaust pollutants.

BACKGROUND OF THE INVENTION

The nature of gas turbines is such that they emit small amounts of undesirable pollutants into the surrounding atmosphere, particularly when using residual fuels having a high fuel-bound nitrogen content. These fuels are often the ones that are most readily obtainable and therefore the most economical to use. Although smoke, excess carbon monoxide and unburned hydrocarbons all constitute undesirable pollutants in the exhaust of state-of-the-art gas turbines, it is the emission of excess amounts of nitrogen oxides ($NO_x$) which causes particular concern, owing to the adverse effects attributed to these gases. Thus, it becomes particularly desirable to provide a combustion control system which permits the use of such fuels in gas turbines with a minimum amount of undesirable exhaust emission.

It is well known that lowering the temperature of combustion will decrease the concentration of nitrogen oxides in the turbine exhaust gases. It has also been demonstrated that burning the turbine fuel with excess air, i.e. using a fuel-lean mixture in the combustion process, will accomplish such a temperature reduction. However, the leanness of the fuel-air mixture required to effect a flame temperature reduction at full turbine load will not support a satisfactory flame under low load or under start-up conditions. When the latter conditions prevail, the turbine will operate at poor combustion efficiency, or not at all, if the same fuel mixture is used as at full load. Incomplete burning of the fuel mixture will occur, resulting in the presence of excessive amounts of carbon monoxide and unburned hydrocarbons in the turbine exhaust.

Existing combustion control systems which attempt to solve the problem of $NO_x$ emission by the use of variable geometry, whereby the fuel is burned with excess air, frequently operate with a relatively large variation in the pressure drop across the combustor. This variation occurs as the load on the turbine changes and it has an adverse effect on the overall operation. Further, because the control mechanism employed is usually integral with the combustor, the overall structure is mechanically complex and thus costly to build and maintain. Another disadvantage resides in the fact that existing combustors cannot be easily retro-fitted to incorporate this type of control system.

OBJECTS OF THE INVENTION

It is a primary object of the present invention to provide a combustion control system for gas turbines which is not subject to the foregoing disadvantages.

It is another object of the present invention to provide a combustion control system for gas turbines whereby the emission of undesirable pollutants is reduced over a wide turbine load range.

It is a further object of the present invention to provide a combustion control system for gas turbines which enables the combustor to operate at or near maximum efficiency throughout a wide turbine load range.

It is still another object of the present invention to provide a combustion control system for gas turbines wherein the variation of the pressure drop across the combustor remains within acceptable limits over a wide turbine load range.

It is still a further object of the present invention to provide a combustion control system for gas turbines which is mechanically simple and which is less expensive to implement and to maintain in new and in existing turbines than heretofore available variable geometry control systems.

These and other objects of the present invention, together with the features and advantages thereof will become apparent from the following detailed specification when read in conjunction with the accompanying drawings.

DESCRIPTION OF THE INVENTION

Figure 1:
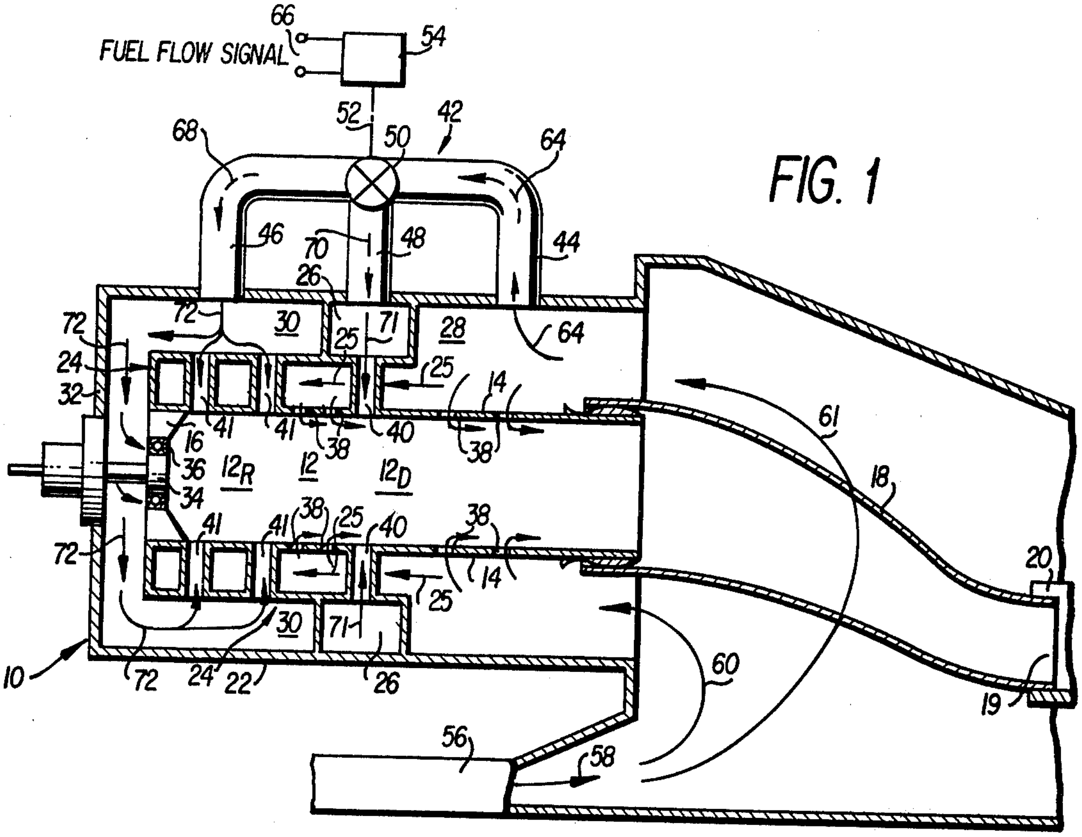
FIG. 1 is a cross-sectional view of one embodiment of the invention which forms the subject matter of this application.

With reference now to the drawings, a combustion system is shown generally designated by reference numeral 10. The combustion system includes a combustion liner 14, preferably in the shape of a cylinder, which defines a combustion chamber 12. An end wall 16 terminates one end of chamber 12. The opposite end of the chamber may engage a transition piece 18 which couples the exit 19 of the chamber to the input 20 of a turbine driving the combustor and load. An outer casing 22 surrounds the chamber and is radially spaced therefrom to define annular spaces therebetween.

A hollow flow shield 24, shown enlarged in FIG. 1 for the sake of illustration, is positioned in the aforesaid annular space in contact with liner 14 and surrounding the latter. An annular plenum chamber 26 is positioned between flow shield 24 and outer casing 22. The plenum chamber divides the annular space into first and second space portions 28 and 30 respectively, isolated from each other. One end of outer casing 22 terminates in a casing end wall 32, while the other end forms part of the overall structure of the turbine with which the combustor operates. In practice, more than one combustor will, as a rule, be associated with a single turbine. In a practical example, each turbine may operate with a plurality of combustors, such as (six to twelve). A fuel nozzle 34 extends through end walls 16 and 32 respectively, into a reaction zone $12_R$ of chamber 12. Nozzle 34 is surrounded by air swirlers 36. Chamber 12 further includes a dilution zone $12_D$ which is axially displaced downstream from the reaction zone.

As shown in FIG. 1, hollow flow shield 24 communicates with the interior of chamber 12 through holes 38 in combustion liner 14. While illustrated only at selected points in the cross-sectional view of FIG. 1, it will be understood that these holes are located all around the periphery of liner 14 in a preferred embodiment of the invention. Plenum chamber 26 communicates with dilution zone $12_D$ through a set of passages 40. In a preferred embodiment of the invention four such passages are provided, spaced 90° apart from each other around the inner perimeter of plenum chamber 26. More passages may be provided, as needed. Passages 40 extend through flow shield 24 from which they are hermetically isolated. Thus, they do not communicate with the interior of the flow shield, nor do they obstruct air circulation through the shield.

As previously explained, the plenum chamber 26 divides the annular space into separate annular space portions 28 and 30 which are isolated from each other. Space portion 30 communicates with reaction zone $12_R$ through a set of passages 41. Passages 41 are similarly positioned around the periphery of chamber 12. Further, they extend completely through the flow shield from which they are hermetically isolated.

An air conduit, generally designated by the reference numeral 42, includes first, second and third legs, designated 44, 46 and 48 respectively. Conduit 42 preferably has a circular cross section throughout. As best seen from FIG. 2, the conduit is mounted externally on combustor 10. Conduit leg 44 communicates with annular space portion 28, while leg 46 communicates with annular space portion 30. Leg 48 communicates with plenum chamber 26.

A valve 50 is positioned at the junction of legs 44, 46 and 48 and is adapted to control the relative proportions of air flowing into legs 46 and 48. A mechanical linkage 52 connects valve 50 to a valve control unit 54, which is electrically actuated from terminals 66. Valve 50 may be selected from one of several well known types, e.g. a three-way valve commercially available from the Masoneilan Company. In the latter case valve control unit 54, in the form of an electric motor, is integral with valve 50, although it may also constitute a separate unit. Further, the valve control unit may be actuated in different ways, e.g. electrically, pneumatically, etc.

It will be apparent from the explanation above that two distinct air paths exist between space portion 28 and combustion chamber 12, both paths sharing leg 44. Beyond valve 50, the first of these paths includes leg 46, second space portion 30 and passages 41 which enter the combustion chamber in the vicinity of reaction zone $12_R$. The second path includes leg 48, plenum chamber 26 and passages 40 which enter the combustion chamber in the vicinity of dilution zone $12_D$.

The gas turbine with which the combustion control system under consideration here is intended to work is of the reverse flow can-type. In operation, air from compressor discharge 56 enters the combustor in the characteristic reverse flow pattern, as indicated by arrows 58, 60 and 61. A small portion of this air, which has a temperature on the order of 600° F. for state-of-the-art simple cycle industrial gas turbines, enters flow shield 24 and is utilized for cooling purposes. This flow of cooling air, designated by reference numeral 25, passes into the interior of the combustion chamber through holes 38, in the nature of louvers or slots in combustor liner 14, to form a cooling film. Within chamber 12 the flow of the cooling air is along the interior surface of combustion liner 14 toward chamber exit 19. Thus, this airflow serves a cooling function with respect to combustion liner 14 by passing along its outside and inside surfaces.

A portion of the compressor discharge air passes into space portion 28 which surrounds combustion chamber 12. Since plenum chamber 26 divides the annular space between outer casing 22 and combustion liner 14, (actually between casing 22 and flow shield 24), into separate portions 28 and 30 which are isolated from each other, the incoming compressor discharge air is blocked from entering space portion 30 directly. Instead it is directed into conduit leg 44, as indicated by arrows 64. Valve 50 controls the relative proportions of airstream 64 which are permitted to enter the aforesaid first and second air paths respectively. The setting of valve 50 is determined by the signal applied to terminals 66 which varies as a function of the load on the turbine. Since fuel flow into nozzle 34 is a function of turbine load, this signal may be advantageously derived from a conventional fuel flow measuring instrument in a preferred embodiment of the invention. It will be understood, however, that alternative means for deriving signals that vary with the load on the turbine may be employed. For example the valve setting may be controlled in accordance with the turbine discharge temperature, or in accordance with the pressure at the compressor output, or both, the measurement of these operating conditions being readily implemented in a conventional manner. Further, the valve setting may be controlled in accordance with other operating conditions, such as the temperature and pressure of the ambient air in which the turbine operates. These conditions have an effect on the air temperature at the discharge of the compressor which can be readily monitored with conventional equipment so as to derive a signal for energizing valve control unit 54. The various measuring instruments discussed above have been omitted from the drawings for the sake of clarity and because they are well known to those skilled in the art.

For ease of description, the following operation of the combustion system in accordance with the present invention is directed to a fuel-lean mixture in the reaction zone. However, operation in a fuel-rich mode is substantially the same but for a difference in air flow between the first and second zones and, of course, a difference in the liner hole pattern.

The airflow represented by arrows 64 divides into airstreams 68 and 70 which enter conduit legs 46 and 48 respectively. Any variation of the valve setting will change the relative volumes of these airstreams inversely with respect to each other. The valve setting is such that airstream 68 supplies air in excess of that required to support combustion, i.e. the combustor will operate with either a fuel-lean or a fuel-rich mixture. Additionally, in accordance with the present invention the proportion of air to fuel is varied with the turbine load. In a practical embodiment of the invention, airstream 68 constitutes approximately 80% of airstream 64 under full load conditions for fuel lean operation.

As airstream 68 flows into space portion 30, it divides into separate airstreams 72 some of which enter combustion chamber 12 through passages 41 in the vicinity of the reaction zone. The latter passages are uniformly positioned around the perimeter of the combustion chamber so that the air jets pass into the reaction zone in a symmetrical manner. The excess air contained in airstream 72 serves to decrease the temperature in the reaction zone to below that found in conventional combustors. As a consequence, the production of $NO_x$ in the combustion process is materially reduced.

As illustrated in FIG. 1, a portion of airflow 72 passes into the space between chamber end wall 16 and end wall 32 of outer casing 22. Some of this air enters the combustion chamber through swirlers 36 so as to promote recirculation which improves stability, and to provide the necessary turbulence which facilitates thorough mixing between the fuel dispensed by nozzle 34 and the air in reaction zone $12_R$. The purpose of such mixing is to perfect the combustion process, i.e. to make it as complete as possible. As a result, the products of incomplete combustion in the turbine exhaust, such as excess carbon monoxide and unburned hydrocarbons, are materially reduced and the overall efficiency of operation of the turbine is enhanced.

Airstream 70, which constitutes approximately 20% of airstream 64 when the turbine is operating under full load, is diverted into conduit leg 48 and enters plenum chamber 26 which encircles combustion chamber 12. Separate airstreams 71 enter the combustion chamber through passages 40 in the vicinity of dilution zone 12$_D$. The introduction of this airflow into the dilution zone serves to lower the temperature in that zone to the normal turbine inlet temperature under full load conditions. As is customary in combustors, the lower temperature protects the turbine blades from damage when the air in the combustion chamber is subsequently expelled through exit 19.

As the load on the turbine changes from full load to some other condition, fuel flow into nozzle 34 decreases and the signal applied to terminals 66 changes accordingly. Due to the responsive action of control unit 54, the setting of valve 50 is changed to divert a larger proportion of airstream 64 into conduit leg 48. Let it be assumed that the turbine load has changed so that the turbine is now operating at a very low load. The signal which responds to the new condition causes valve 50 to be set to a position wherein the proportion of airstream 64 which is diverted to conduit leg 48, i.e. airstream 70, is on the order of 60%. As a consequence, airstream 68 is reduced in volume by a proportional amount so that the fuel mixture is enriched sufficiently to maintain efficient combustion in the reaction zone. The additional air diverted to leg 48 and thus to the dilution zone, produces no adverse effect on the operation of the combustor and merely enhances the mixing action which takes place in the dilution zone. Hence, by controlling the airflow which is permitted to enter the reaction zone between a maximum volume at full load and a minimum volume at low load (or start-up), satisfactory combustion is maintained across the full load range of the turbine without large changes in pressure drop across the liner.

Figure 3:
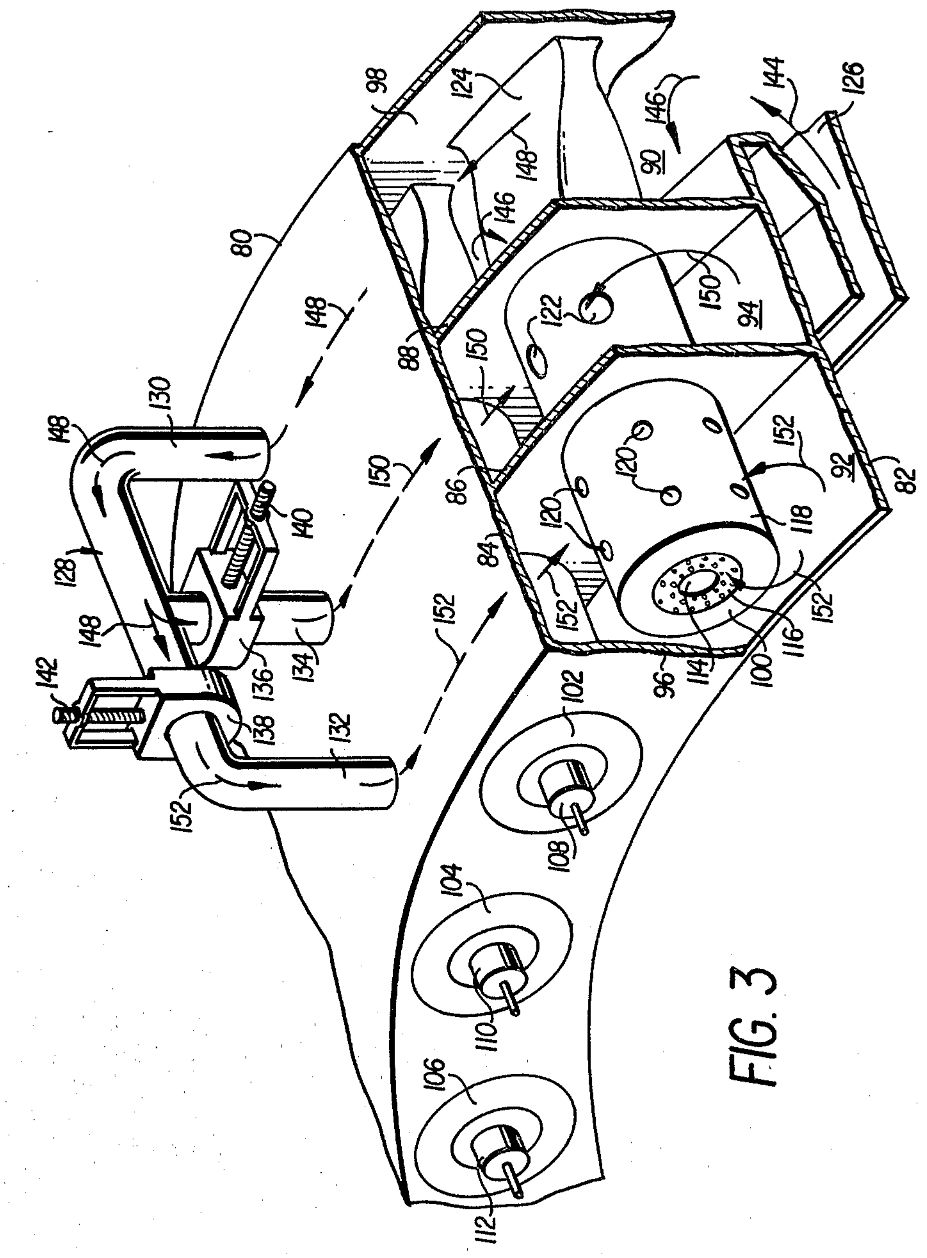
FIG. 3 illustrates another embodiment of the present invention in perspective view.

FIG. 3 partially illustrates another embodiment of the present invention. A reverse flow combustion system is shown which comprises a casing, generally designated by the reference numeral 80, having a substantially annular configuration. Casing 80 includes radially spaced inner and outer casing walls 82 and 84, which are generally cylindrical and coaxial with each other. A pair of annular end walls 96 and 98 extend between casing walls 82 and 84 substantially normal to the casing axis, such that the casing encloses an annular space. A pair of baffles 86 and 88, disposed parallel to end walls 96 and 98 and axially spaced from each other, define first, second and third annular space portions 90, 92 and 94 respectively, within the casing. The baffles extend between casing walls 82 and 84 such that the respective space portions are isolated from each other.

A plurality of substantially identical combustors, such as shown at 100, 102, 104 and 106, are disposed inside the casing with their axes parallel to the casing axis and with successive combustors uniformly spaced about the casing axis. Each combustor extends from one casing end wall through baffles 86 and 88 to the opposite casing end wall. Thus, each combustor segment containing the combustor reaction zone is located in space portion 92, the combustor segment containing the dilution zone is located in space portion 94, and the segment which makes up the transition piece 124 is located in space portion 90. The transition piece of each combustor extends through end wall 98 to the input of the gas turbine which is driven by the combustion system. Within each of the space portions 90, 92 and 94 respectively, the combustors are spaced from casing walls 82 and 84 so that air within each particular space portion can circulate around the combustor segment enclosed by that space portion.

Combustors 102, 104 and 106 are seen to have fuel nozzles 108, 110 and 112 respectively, which extend through casing end wall 96 into the reaction zone of the respective combustors. Combustor 100, which is substantially identical to the other combustors, has an identical fuel nozzle which is not visible in the cutaway view of FIG. 3.

In the following explanation, combustor 100 is treated as representative of the other combustors. As was the case in the embodiment illustrated in FIG. 1, combustion chamber 114 is defined by a combustion liner 116, which in turn is surrounded by a hollow flow shield 118 in contact therewith. A first set of passages 120, uniformly spaced around combustor 100, extends through flow shield 118, each passage being hermetically isolated from the interior of the latter. Passages 120 communicate between space portion 92 and the reaction zone of combustion chamber 114. Similarly, a second set of passages 122, uniformly spaced about combustor 100, extends through the interior of hollow flow shield 118, each passage being hermetically isolated from the latter. Passages 122 communicate between space portion 94 and the dilution zone of combustion chamber 114.

Combustion transition piece 124 is disposed in space portion 90 which communicates with compressor discharge 126 in a reverse flow configuration. Space portion 90 also communicates with a plurality of air conduits 128, only one of which is shown in FIG. 3. In a preferred embodimwent four conduits are employed, spaced at 90° intervals around the periphery of outer casing wall 84. Each conduit 128 includes first, second and third conduit legs 130, 132 and 134 respectively. Leg 130 communicates with space portion 90 through outer casing wall 84. Similarly, legs 132 and 134 communicate with space portions 92 and 94 respectively, through outer casing wall 84.

A valve 136 is disposed in conduit leg 134 and is adapted to control the airflow through this leg. A valve 138 is disposed in leg 132 and is adapted to control the airflow through the latter leg. These separate valves are the functional equivalent of three-way valve 50, as shown in the embodiment illustrated in FIG. 1. However, since valves 136 and 138 are individually operated through their respective mechanical linkages 140 and 142 respectively, in accordance with fuel flow to their respective fuel nozzles, such as an arrangement affords greater flexibility and hence better control under certain operating conditions.

For the sake of simplicity, the operation will be described with respect to a single conduit 128 only. Air arrives from compressor discharge 126, as indicated by arrow 144, and enters first space portion 90. A small portion of this airflow, as indicated by arrows 146, passes into hollow flow shield 118 which extends through baffle 88 into space portion 90. The major portion of the compressor discharge air flows into conduit leg 130 which, as previously explained, communicates with space portion 90 through outer casing wall 84. This airstream is designated by reference numeral 148 which is thus representative of a first air path. This airflow subsequently divides into airstreams 150 and 152 in proportions determined by the relative settings of valves 136 and 138.

Airstream 152 passes through conduit leg 132 into space portion 92, whereupon it enters combustion chamber 114 in the vicinity of the reaction zone, through passages 120. This flow of air thus establishes a second air path. A portion of airstream 152 also enters the combustion chamber through swirler means, (not shown), in the vicinity of the fuel nozzle, as indicated by the arrow. A third air path is established by airstream 150, which passes through conduit leg 134 into space portion 94, whereupon it enters the dilution zone of the combustion chamber through passages 122.

The function of the air passing into the reaction and dilution zone respectively, of each combustor is substantially identical with that described in connection with the embodiment of FIGS. 1 and 2. Thus, air is admitted to space portion 94, and hence to the reactio zone of each combustor, at maximum volume when the turbine is operating at maximum load. For low load conditions, or for start-up, the airflow to the reaction zone of each combustor is decreased, the amount so subtracted passing into the dilution zone through conduit leg 134. Thus, valves 136 and 138 are capable of varying the volume of air flowing into conduit legs 134 and 132 respectively, inversely with respect to each other.

Figure 2:
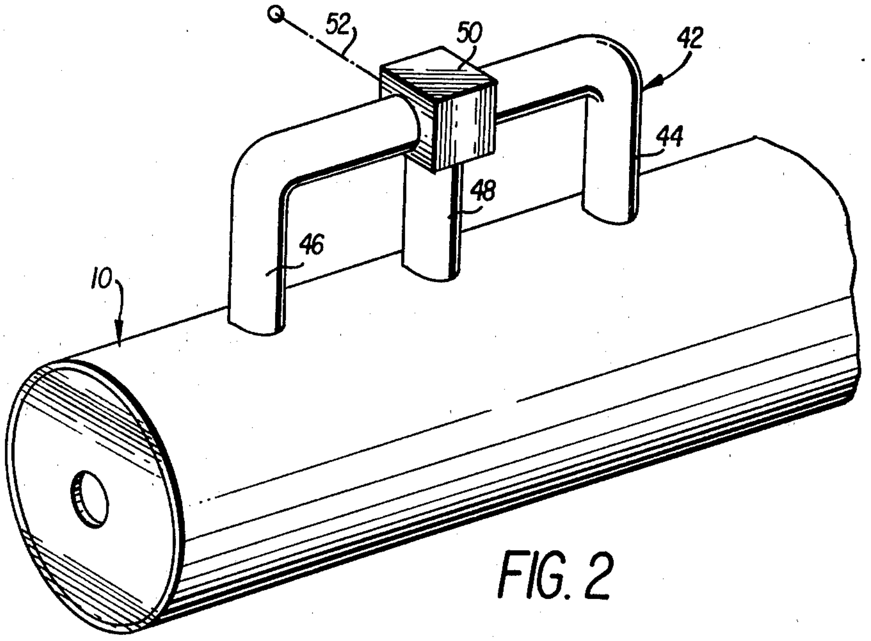
FIG. 2 illustrates a portion of the apparatus of FIG. 1 in perspective view.

The embodiment shown in FIG. 3 affords certain manufacturing economies over that illustrated in FIGS. 1 and 2. In part this is due to the fact that a separate conduit is not required for each combustor. Although four conduits are preferably employed, under certain conditions a smaller number may be used. It will be understood that in each instance the conduits must be of adequate size to accomodate the airflow for the appropriate number of combustors. Similarly, the conduit valves must be large enough to handle the increased airflow.

The combustion control system which forms the subject matter of the present invention incorporates important advantages over prior art control systems, particularly those which employ variable geometry. By allowing the pressure drop to take place across the valve upstream of the combustor, the range of variation of the pressure drop across the combustor is minimized as the load on the turbine varies. This feature of the present invention confers an important advantage. It is of particular value in gas turbines used in industrial applications which commonly have a high fuel turndown ratio, i.e. a high ratio of fuel flow at full load to fuel flow at no load. Also, the smaller pressure drop variation will minimize the effects of inlet velocity of the air jets entering the reaction and dilution zones.

The present combustion control system not only enables the combustor to operate efficiently throughout a broad range of turbine loads, but it provides further latitude of operation by enabling the combustor to use excessively rich fuel mixtures as well as very lean mixtures. This permits the use of fuels haivng a high fuel-bound nitrogen content, such as residual fuels, which are often in greater supply and therefore more economical to use, without obviating the use of distillate fuels. By reducing the production of nitrogen oxides from both the air and the fuel, as well as smoke in the turbine discharge, the present invention avoids many of the pollution problems associated with the burning of these fuels in existing gas turbines that have been modified for low nitrogen oxides.

A further feature of the invention resides in the improvement of the combustion efficiency which is achieved across the entire operating range by the use of the combustion control system herein disclosed. As a consequence, the combustion process is more complete than is achievable by conventional techniques and the combustor discharges smaller amounts of polluting carbon monoxide and unburned hydrocarbons than would otherwise be the case, particularly where a single-shaft, constant speed turbine is employed.

The control system which forms the subject matter of the present invention is mechanically simple and can therefore be economically implemented. By positioning the regulating mechanism externally of the casing, the system not only permits maintenance, repairs and modifications to be carried out with a minimum of effort and cost, but it also affords the opportunity of retrofitting existing gas turbines with the improved combustion control system at relatively low cost.

From the foregoing explanation, it will be clear that the present invention lends itself to a number of modifications and substitutions. As already explained, the invention is not limited to a particular type of valve, but any valve, or combination of valves, which performs the function of inversely varying the airstream in the first and second conduit legs with respect to each other may be employed. It will be understood that each of the respective embodiments of the invention which are illustrated in FIGS. 1 and 3 may use either a three-way valve or a combination of valves. Valve control unit 54 may constitute any one of a number of well known control units and may be either integral with, or separate from, the valve itself. If the valve control unit is electrically actuated, the applied signal may be derived from a number of different sources, provided only that the signal varies as a direct function of the load on the turbine. Similarly, if pneumatic valve controls are employed, the actuating signal must vary as a direct function of the load.

While the present invention is intended to work in the context of a reverse flow gas turbine, the specific dimensions and geometry shown in the drawings are not intended to be limiting. For example, flow shield 24 in FIG. 1, or 118 in FIG. 3, preferably occupies a smaller portion of the space between the combustor and the casing. Similarly, the number of holes shown in the flow shield, and the number of passages extending through the flow shield, are intended to be exemplary only. In the embodiment of FIG. 2, the number of conduits used may be varied from what is shown in the drawing.

It will be apparent that numerous variations, modifications, substitutions and equivalents will now occur to those skilled in the art, all of which fall within the spirit and scope of the present invention. Accordingly, the invention is intended to be limited only by the scope of the claims appended hereto:

What is claimed is:

1. In a gas turbine of the type wherein at least one combustor is coupled to the discharge of the compressor and the fuel is burned with excess air or excess fuel to maintain a low temperature of combustion, said combustor having a substantially tubular configuration and including a combustion liner configured to define an elongate combustion chamber substantially centered about an axis, said combustion chamber terminating in a chamber end wall at one end thereof and including a reaction zone near said chamber end wall and a dilution zone axially spaced from said reaction zone, fuel supply means extending into said reaction zone, and a hollow casing surrounding said combustor, said casing coaxially surrounding said combustor such that said space forms an annular configuration;

a combustion control system comprising:

means for dividing the space within said casing at least into first and second space portions isolated from each other and in substantial alignment with each other in an axial direction, said dividing means comprising a plenum chamber positioned in said annular space between said first and second space portions;

means for coupling said first space portion to said compressor discharge in a reverse flow configuration;

first and second air paths extending from said first space portion to said reaction zone and said dilution zone respectively, said paths comprising conduit means positioned externally of said casing, said conduit means including first, second and third conduit legs communicating respectively with said first space portion, said reaction zone and said dilution zone, said first and second conduit legs being coupled through said casing to said first and second space portions respectively, said first leg being shared by said first and second paths and said first path further including said second leg, and a first plurality of passages communicating between said second space portion and said combustion chamber in the vicinity of said reaction zone, said second path further including said third leg coupled through said casing to said plenum chamber, and a second plurality of passages communicating between said plenum chamber and said combustion chamber in the vicinity of said dilution zone;

means external to said casing and upstream of said combustion chamber for varying the airflow in respective ones of said paths inversely with respect to each other, said means for varying said airflow comprising valve means adapted to admit air from said first leg in variable proportions to said second and third legs respectively;

control means connected to said airflow varying means adapted to control the setting of the latter such that airflow from said first space portion into said first and second paths varies as a direct and inverse function respectively of at least one operating condition of said apparatus; and means controlled in accordance with at lest one load-responsive operating condition for energizing said control means to determine the setting of said valve means;

whereby said turbine is enabled to operate efficiently with a fuel-lean or fuel-rich mixture across a wide load range and with minimum emission of exhaust pollutants.

2. Apparatus in accordance with claim 1 wherein said first and second space portions and said plenum chamber each surround said combustion chamber; and wherein said first and second pluralities of passages are respectively positioned substantially uniformly around the periphery of said combustion chamber.

3. Apparatus in accordance with claim 2 wherein said casing includes an end wall axially spaced from said chamber end wall to define an end space therebetween continuous with said second space portion;

said fuel supply means comprising a fuel nozzle extending through both said end walls into said reaction zone; and swirler means positioned in said chamber end wall surrounding said nozzle, said swirler means being adapted to admit air from said end space to said combustion chamber in a manner adapted to create turbulence in said reaction zone.

4. Apparatus in accordance with claim 2 and further including a hollow flow shield disposed in said annular space, said flow shield surrounding said combustion liner in contact therewith and communicating with said combustion chamber through openings in said liner, said flow shield being disposed to receive air from said compressor discharge;

said plenum chamber extending from said flow shield to said casing between said first and second space portions; and said passages extending through said flow shield hermetically isolated from the interior thereof.

5. Apparatus in accordance with claim 1 wherein said combustion control system controls a plurality of combustors;

said casing comprising a substantially annular configuration centered about a casing axis and including radially spaced inner and outer casing walls coaxial with each other; and said plurality of combustors being disposed between said casing walls spaced therefrom, said combustors being successively positioned around said casing axis at a substantially uniform spacing from each other.

6. Apparatus in accordance with claim 5 wherein said casing includes a pair of annular casing end walls extending between said inner and outer casing walls and substantially normal thereto;

said dividing means comprising a pair of annular baffles substantially parallel to said casing end walls, said baffles being axially spaced from said end walls to define said first and second space portions therewith and being mutually spaced in an axial direction to define a third space portion therebetween, said baffles extending between said inner and outer casing walls such that said space portions are isolated from each other;

said first and second conduit legs being coupled through said outer casing wall to said first and second space portions respectively;

said second path further including said third conduit leg coupled through said outer casing wall, and a second plurality of passages communicating between said third space portion and said combustion chamber in the vicinity of said dilution zone.

7. Apparatus in accordance with claim 6 wherein each of said combustors has an elongate tubular configuration substantially parallel to said casing axis, said combustors extending through said baffles such that the reaction zone and the dilution zone of each combustor are positioned in said second and third space portions respectively.

8. Apparatus in accordance with claim 7 wherein each of said combustors further includes a hollow flow shield surrounding said combustion liner and in contact therewith, said flow shield communicating with said combustion chamber through openings in said liner and extending through one of said baffles to receive air from said first space portion; and said passages extending through said flow shield hermetically isolated from the interior thereof.

9. Apparatus in accordance with claim 1 wherein said energizing means is controlled in accordance with fuel flow to said fuel supply means.

10. Apparatus in accordance with claim 1 wherein said energizing means is controlled in accordance with the temperature at the discharge of said turbine.

11. Apparatus in accordance with claim 1 wherein said energizing means is controlled in accordance with the pressure at the discharge of said compressor.

12. Apparatus in accordance with claim 1 wherein said energizing means is controlled in accordance with the temperature at the discharge of said turbine and with the pressure at said compressor discharge.

13. A control system for regulating the combustion process of at least one combustor having a substantially tubular configuration centered about an axis and disposed within a coaxially surrounding casing such that the space therebetween has an annular configuration, said combustor comprising a combustion chamber defined by a combustion liner, said combustion chamber including a reaction zone and a dilution zone spaced from each other, and fuel nozzle means extending into said combustion chamber in the vicinity of said reaction zone;

said control system comprising:

means for dividing the space within said casing at least into first and second space portions isolated from and in substantial alignment with each other in an axial direction;

means for coupling said first space portion to the air intake of the combustor;

first and second air paths extending from said first space portion to said reaction zone and said dilution zone respectively, said paths comprising conduit means positioned externally of said outer casing, said conduit means including first, second and third conduit legs communicating respectively with said first space portion, said reaction zone and said dilution zone, said first leg being shared by said first and second paths and said first path further including said second legs, and a first plurality of passages communicating between said second space portion and said combustion chamber in the vicinity of said reaction zone and wherein said dividing means comprises a plenum chamber positioned in said annular space between said first and second space portions and said second path including said third leg coupled through said casing to said plenum chamber, and a second plurality of passages communicating between said plenum chamber and said combustion chamber in the vicinity of said dilution zone;

three-way valve means external to said casing and positioned upstream of said combustion chamber for varying the airflow in respective ones of said paths inversely with respect to each other, said three-way valve means positioned at the junction of said conduit legs and said first and second conduit legs being coupled through said casing to said first and second space portions respectively; and control means responsive to fuel flow to said fuel nozzle means for controlling the setting of said three-way valve means such that airflow from said first space portion into said first and second paths varies as a direct and inverse function respectively of said fuel flow;

whereby said combustor is enabled to operate efficiently with a fuel-lean or fuel-rich mixtures across a wide load range and with minimum emission of exhaust pollutants.

14. Apparatus in accordance with claim 13 wherein said first and second space portions and said plenum chamber each surround said combustion chamber; and wherein said first and second pluralities of passages are respectively positioned substantially uniformly around the periphery of said combustion chamber.

15. Apparatus in accordance with claim 14 and further including a hollow flow shield disposed in said annular space, said flow shield surrounding said liner in contact therewith and communicating with said combustion chamber through openings in said liner, said flow shield being adapted to receive air from said combustor air intake;

said plenum chamber extending from said flow shield to said casing between said first and second space portions; and said passages extending through said flow shield hermetically isolated from the interior thereof.

16. Apparatus in accordance with claim 13 wherein said control system is adapted to control a plurality of combustors;

said casing comprising a substantially annular configuration centered about a casing axis and including radially spaced inner and outer casing walls coaxial with each other; and said plurality of combustors being disposed between said casing walls spaced therefrom, said combustors being successively positioned around said casing axis at a substantially uniform spacing from each other.

17. Apparatus in accordance with claim 16 wherein said casing includes a pair of annular casing end walls extending between said inner and outer casing walls and substantially normal thereto;

said dividing means comprising a pair of annular baffles substantially parallel to said casing end walls, said baffles being axially spaced from said end walls to define said first and second space portions therewith and being mutually spaced in an axial direction to define a third space portion therebetween, said baffles extending between said inner and outer casing walls such that said space portions are isolated from each other;

said first and second conduit legs being coupled through said outer casing wall to said first and second space portions respectively;

said second path further including said third conduit leg coupled through said outer casing wall, and a second plurality of passages communicating between said third space portion and said combustion chamber in the vicinity of said dilution zone.

18. Apparatus in accordance with claim 17 wherein each of said combustors has an elongate tubular configuration substantially parallel to said casing axis, said combustors extending through said baffles such that the reaction zone and the dilution zone of each combustor are positioned in said second and third space portions respectively.

19. Apparatus in accordance with claim 18 wherein each of said combustors further includes a hollow flow shield surrounding said combustion liner and in contact therewith, said flow shield communicating with said combustion chamber through openings in said liner and extending through one of said baffles to receive air from said first space portion; and said passages extending through said flow shield hermetically isolated from the interior thereof.

* * * * *